United States Patent [19] [11] 3,926,870
Keegan et al. [45] Dec. 16, 1975

[54] DENTURE ADHESIVE PREPARATION CONTAINING AN ANIONIC PROTEIN MATERIAL

[75] Inventors: James J. Keegan, Bloomfield; Girish Patel, Mine Hill; Howard Rubin, Rockaway, all of N.J.

[73] Assignee: Warner-Lambert Company, Morris Plains, N.J.

[22] Filed: Jan. 15, 1975

[21] Appl. No.: 541,304

Related U.S. Application Data

[63] Continuation-in-part of Ser. No. 406,529, Oct. 15, 1973, Pat. No. 3,878,135.

[52] U.S. Cl. ............... 260/8; 260/DIG. 36; 424/81
[51] Int. Cl.² ............... A61K 31/785; C08L 89/00
[58] Field of Search ........................... 260/8; 424/81

[56] References Cited
UNITED STATES PATENTS

| | | | |
|---|---|---|---|
| 3,336,269 | 8/1967 | Monagle et al. | 260/79.3 |
| 3,406,238 | 10/1968 | Freyermuth et al. | 424/81 |
| 3,472,840 | 10/1969 | Stone et al. | 260/231 |
| 3,878,138 | 4/1975 | Keegan et al. | 260/17 R |

OTHER PUBLICATIONS
Chem. Absts., Vol. 66: 98500y, "Denture Adhesives," Tintex Corp.

*Primary Examiner*—Donald E. Czaja
*Assistant Examiner*—Edward Woodberry
*Attorney, Agent, or Firm*—Albert H. Graddis; Frank S. Chow; Anne M. Kelly

[57] ABSTRACT

An improved anhydrous denture adhesive is prepared to contain a mixture of a cationic polymeric material and an anionic protein material as the adhesive ingredient. The mixture may be formulated as a powder or anhydrous paste, which, when applied to dentures and exposed to moisture, develops superior adhesive properties. Suitable cationic materials include at least one of the following: copolymers of substituted or unsubstituted acrylamide with vinyl quaternary ammonium salts; copolymers of substituted or unsubstituted acrylamide with vinyl and alkyl substituted vinyl pyridinium salts; and an O-lower alkyl-trimethylammonium chloride-substituted-anhydroglucose polymer. As the anionic component there may be used at least one protein material, such as casein or its alkali metal salt derivatives.

16 Claims, No Drawings

DENTURE ADHESIVE PREPARATION CONTAINING AN ANIONIC PROTEIN MATERIAL

CROSS REFERENCE TO RELATED APPLICATION

This application is a continuation-in-part of U.S. Application Ser. No. 406,529, filed Oct. 15, 1973, now U.S. Pat. No. 3,878,135.

BACKGROUND OF THE INVENTION

Traditionally, adherent powders used to secure dentures within the mouth were prepared from such materials as finely powdered natural gums, i.e., karaya, acacia or tragacanth gum. These materials have the particular property of swelling to many times their original volume upon the addition of water to form a gelatinous or mucilaginous mass. Denture adhesive powders may be a combination of one or more natural gums, generally flavored with pleasant tasting volatile oils. Many other additives may also be included, such as antiseptics, stabilizers, bactericides, special deodorants, plasticizing agents, fillers, coloring agents, and the like.

Cream forms of the denture adherent, prepared from finely ground particles of the natural gums dispersed in a cream base, are also available and may be used instead of the powder compositions. In any event, when wet with water, the natural gum in either the cream or powder formulation, expands to become a viscous gel which acts as a cushion and an adherent between the denture plate and the gum tissue.

While these relatively simple formulations are effective in securing dentures within the oral cavity for a short period of time, generally more than one application of the adhesive per day is necessary. This is, at best, inconvenient and, therefore, most undesirable.

In recent years, there have been numerous improvements in the above described simple denture adhesive formulations. For example, in U.S. Pat. No. 3,003,988, a water insoluble, water-sensitized copolymer is disclosed as the adhesive or stabilizing component of a denture composition. Actually, this patent discloses mixed, partial salts of copolymers of maleic anhydride with lower alkyl-vinylethers, and partial esters of these salts, as the adhesive material. For example, the calcium-sodium partial salts of a partial isopropyl ester of methyl vinyl ether/maleic anhydride copolymer is said to provide a superior denture adhesive.

In U.S. Pat. No. 2,997,399, the principal ingredient of the denture adhesive is a hydroxyethyl cellulose having a certain degree of substitution of ethylene oxide groups per anhydro-glucose unit of the cellulose molecule; preferably, there is also present a lower alkyl ether of cellulose, such as methylether of cellulose, exhibiting temperature-dependent viscosity properties, i.e., showing an increase in viscosity with an increase in temperature. As an optional ingredient in the denture adhesive of U.S. Pat. No. 2,997,399, there may be used a polyacrylamide. This optional ingredient is said to produce an improved "feel", "texture", or "body" in the denture adhesive.

U.S. Pat. No. 3,440,065 discloses still another denture adhesive wherein a powdered, insoluble absorptive cellulose material, such as alpha cellulose, wood flour or microcrystalline cellulose, is incorporated into a gum-petrolatum base adhesive. As the gum in the adhesive, sodium carboxymethyl cellulose, hydroxyethyl cellulose, karaya gum, guar gum, tragacanth and mixtures thereof are suggested.

Another improvement over conventional denture adhesives is claimed in U.S. Pat. No. 3,511,791, which teaches that copolymers of acrylamide and acrylic acid, or homopolymers of acrylamide can form the principle adhesive component in a denture adherent to provide sustained adherence in use without swelling. Whenever a homopolymer of acrylamide, which is nonionic in character, is used, gum karaya is added to the formulation in order to provide a synergistic improvement in gel strength and adhesiveness.

Further, U.S. Pat. No. 3,575,915 discloses a superior denture adhesive containing polyvinyl acetate, water, ethanol, a mineral hydrocolloid, such as colloidal silicate, and a plasticizer.

U.S. Pat. No. 2,978,812 discloses the addition of ethylene oxide homopolymers to denture adhesive gums, including cellulose derivatives, to improve adhesive qualities.

U.S. Pat. No. 3,736,274 discloses a denture adhesive containing three essential ingredients: a maleic anhydride and/or acid copolymer (with a lower alkyl vinyl ether), a polymeric N-vinyl lactam, and sodium carboxymethyl cellulose.

While all of the above denture adhesives provide some improvement over simple formulations containing only finely powdered natural gums, it is generally recognized that no one product has yet been developed which can accommodate, over a long period of time, the many variations in temperature, pH and mechanical agitation which are quite normal in the oral cavity.

It has now been found that the denture adhesive of this invention will provide superior adherent properties over prolonged periods of time and under unusually varied conditions, without the disadvantages characteristic of previously known products.

SUMMARY OF THE INVENTION

An anhydrous denture adhesive comprises a mixture of a cationic polymeric component and an anionic protein component which, when applied to dentures and exposed to moisture, develops adhesive properties. Suitable cationic materials include at least one of the following: copolymers of substituted or unsubstituted acrylamide with vinyl quaternary ammonium salts; copolymers of substituted or unsubstituted acrylamide with vinyl and alkyl-substituted vinyl pyridinium salts; and an O-lower alkyl-trimethylammonium chloride-substituted-anhydroglucose polymer. As the anionic protein component there may be used at least one casein protein material such as sodium or potassium caseinate. In the preferred products of the invention, the cationic component is a copolymer of acrylamide with a vinyl quaternary ammonium salt and the anionic protein material is sodium caseinate.

DESCRIPTION OF THE INVENTION

This invention relates to an anhydrous denture adhesive, which, when in contact with moistened denture plates and the saliva, hydrates within the oral cavity to provide superior adherent properties. The principal adhesive force develops when the mixture of the anhydrous cationic polymeric component and the anhydrous anionic protein material is exposed to moisture. The term cationic polymeric component is meant to include one or more of the following polymeric components:

1. copolymers of an acrylamide having the formula:

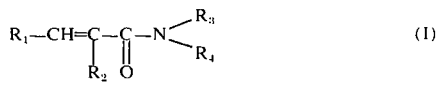

(1)

wherein $R_1$ is methyl or hydrogen; and $R_2$, $R_3$, and $R_4$ are each hydrogen or alkyl, with vinyl quaternary ammonium salts including trialkylaminoalkyl acrylate salts, trialkylaminoalkyl methacrylate salts, and vinyloxyalkyltrialkylammonium salts; wherein the alkyl groups are 1 to 7 carbon lower alkyl, preferably 1 to 3 carbon lower alkyl;

2. copolymers of an acrylamide having the Formula (I) above with vinyl and alkyl-substituted vinyl pyridinium salts including 2-vinyl pyridinium salts, 4-vinyl pyridinium salts, 2-alkyl-5-vinyl pyridinium salts, and 2-vinyl-5-alkyl pyridinium salts, wherein the alkyl groups are 1 to 7 carbon lower alkyl, preferably 1 to 3 carbon lower alkyl; and 3. an O-lower alkyl-trimethylammoniumchloride-substituted-anhydroglucose polymer wherein there are 1 to 7, preferably 1 to 3 carbon atoms in the alkyl group.

As the quaternary-forming salts in (1) and (2) above there may be mentioned such non-toxic, quaternary forming salts as alkyliodide, alkylchloride, alkylbromide, and alkyl sulfate salts wherein the alkyl group is a lower alkyl group containing 1 to 7 carbon atoms, preferably 1 to 3 carbon atoms. Methylsulfate salts are particularly preferred. Copolymers of substituted and unsubstituted acrylamide in (1) and (2) above are described in U.S. Pat. Nos. 3,336,269, 3,336,270, and 3,509,113. They are prepared, as described in these last mentioned patents, by a solution polymerization process, wherein an acrylamide monomer having the Formula I above and, optionally, an ethylenically unsaturated comonomer, are dissolved in a special solvent (either an acetone-water mixture or an acetone-tertiary-butanol-water mixture) and polymerized to yield a polymeric product in the form of relatively unswollen, hard, non-tacky granules which can be readily isolated from the polymerization reaction by simple filteration, since the polymeric products are not soluble in the polymerization solvent. The polymerization is carried out in the substantial absence of air and the use of a polymerization initiator is recommended. The polymerization temperature is dependent upon the particular initiator used in the system. The concentrations of solvent and the monomer in the polymerization mixture is critical: for the monomers, 5% – 50% (preferably 20% – 35%) by weight, based on the weight of the polymerization reaction mixture is recommended; for the acetone-water mixture solvent, 30% – 70% (preferably 35% – 50%) is used; and for the acetone-tertiary butanol-water mixture solvent, 5% – 65% (preferably 30% – 50%) is recommended, with the amount of tertiary butanol in this last solvent being 5% – 65% (preferably 30% – 50%) by weight, based on the weight of the solvent mixture.

As is usual for polymerization reactions, the molecular weight of the polymers obtained varies directly with the monomer concentration used in the initial reaction mixture. Monomer concentration should be from 15% – 50%, preferably 20% – 35% by weight of the total polymerization reaction mixture if high molecular weight polymers are desired. Monomer concentrations above 50% yield polymeric products having undesirably large, sticky gel particles. For low molecular weight polymers, monomer concentrations below 10% must be used. However, concentrations below 4% – 5% are impractical, since a suspension instead of the desired precipitate of the polymer is obtained.

By selecting suitable concentrations of ingredients and polymerization conditions as described in U.S. Pat. Nos. 3,336,269, 3,336,270, and 3,509,113, it has been found to be possible to obtain cationic polymers and copolymers in the form of finely divided powders having molecular weights of from 5 million to 10 million, which are suitable for use as a cationic ingredient in the denture adhesive of this invention. These polymers and copolymers are soluble in warm or cold water and produce clear solutions having viscosities of from 700 to 1800 centipoises, as measured in a 1% aqueous solution of the polymer, at 25°C with a standard Brookfield LVF Viscometer.

The third cationic polymeric ingredient described in (3) above as an O-lower alkyl-tri-methylammonium chloride-substituted-anhydroglucose polymer, wherein the alkyl group is a 1 to 7 carbon lower alkyl, preferably 1 to 3 carbon lower alkyl, is more fully described in U.S. Pat. No. 3,472,840, patented Oct. 14, 1969. Polymers of this type are characteristically cationic; and a particularly preferred cationic polymer in this class is water soluble and, at a concentration of 1% and a temperature of 25°C, yields a solution having a viscosity of 400 centipoises.

Among the above-described types of cationic polymeric materials, the following have been found to be particularly suitable for use in the denture adhesive of this invention:

1. copolymers of acrylamide with vinyl quaternary ammonium salts including trialkylaminoalkyl acrylate salts, trialkylaminoalkyl methacrylate salts, and vinyloxyalkyltrialkylammonium salts, wherein the alkyl groups are 1 to 7 carbon lower alkyl, preferably 1 to 3 carbon lower alkyl; and 2. copolymers of acrylamide with vinyl and alkyl-substituted vinyl pyridinium salts including 2-vinyl pyridinium salts, 4-vinyl pyridinium salts, 2-alkyl-5-vinyl pyridinium salts, and 2-vinyl-5-alkyl pyridinium salts, wherein the alkyl groups are 1 to 7 carbon lower alkyl, preferably 1 to 3 carbon lower alkyl.

As typical trialkyl aminoalkyl acrylate salt monomers there may be mentioned acryloyloxymethyltrimethyl ammonium methylsulfate; 2-acryloyloxyethyltrimethyl ammonium methylsulfate; 3-acryloyloxypropyl-trimethyl ammonium methylsulfate; and acryloyloxymethyltriethyl ammonium ethylsulfate.

As typical trialkylaminoalkyl methacrylate salt monomers there may be mentioned methacryloyloxymethyltrimethyl ammonium methylsulfate; 2-methacryloyloxyethyltrimethyl ammonium methylsulfate; 2-methacryloyloxyethyltriethyl ammonium ethylsulfate; and 3-methacryloyloxypropyltrimethyl ammonium methylsulfate.

As typical vinyloxyalkyltrialkylammonium salt monomers there may be mentioned 2-vinyloxyethyltrimethyl ammonium methylsulfate; 3-vinyloxypropyltrimethyl ammonium methylsulfate; and vinyloxymethyltrimethyl ammonium methylsulfate.

As typical vinyl pyridinium salts there may be mentioned 1-methyl-2-vinyl pyridinium methylsulfate; 1-ethyl-4-vinyl pyridinium ethyl sulfate; 1,2-dimethyl-5-vinyl pyridinium methylsulfate; 1-methyl-2-vinyl-5- ethyl pyridinium methylsulfate; and 1-methyl-2-vinyl-5-propyl-pyridinium methylsulfate.

The amount of each monomeric component in the above-mentioned cationic copolymers utilized in the denture adhesive of the invention may be varied within certain ranges to provide a product suitable for use in the denture adhesive of this invention. Generally, from 50% to 90% by weight of the acrylamide type monomer, preferably 63% to 85%, most preferably 85% by weight, based on the total weight of the copolymer, is used. Correspondingly, from 10% to 50% by weight of the vinyl quaternary ammonium salt (or the vinyl pyridinium salt) comonomer, preferably 15% to 37%, most preferably 15% by weight, based on the total weight of the copolymer, is used.

The preferred cationic component for the denture adhesive of this invention is a copolymer of acrylamide with one of the above-mentioned vinyl quaternary ammonium salts.

In a most preferred embodiment of this invention, the cationic component comprises 85% by weight of acrylamide and 15% by weight of a trialkylaminoalkyl methacrylate salt having 1 to 3 carbon atoms in the alkyl group, i.e., 2-methacryloyloxyethyltrimethyl ammonium methylsulfate, based on the total weight of the copolymer.

As the anionic protein material in the denture adhesive of this invention, there may be used one or more casein protein material such as casein or its alkali metal salts. Casein is a white amorphous powder, sparingly soluble in water, which is the principal protein of cow's milk. The sodium and potassium salts of casein have improved water solubility. Casein and its alkali metal salts are commercially available. These protein materials have anionic characteristics, and are suitable for use in the practice of this invention. The preferred anionic protein material is a sodium caseinate.

The denture adhesive of this invention may be formulated to contain the cationic polymer and the anionic protein material in either powder or paste form. In the powder formulation, the two anhydrous, particulate, components are admixed with the usual flavors and colorants in the following proportions: for the cationic polymer, from 1% to 80% preferably from 3% to 50% by weight, based on the weight of the total formulation is suitable; for the anionic protein material, from 10% to 90%, preferably from 20% to 80%, by weight, based on the weight of the total formulation may be used.

Other ingredients such as non-toxic anti-caking agents, (silica, magnesium stearate, talcum powder or the like) may also be included in the denture adhesive powder formulation. A particularly preferred additive in formulations is a powdered polyethylene or powdered polypropylene which has been found to improve wettability characteristics of anhydrous products, as more fully described in co-pending U.S. Application Ser. No. 302,162, filed Oct. 30, 1972, now U.S. Pat. No. 3,878,138. The powdered polymeric material has a particle size of less than 422 microns, preferably between 74 to 149 microns and is incorporated in amounts of from 40% to 60%, preferably 45% to 55% by weight to improve wettability. The polyethylene powder used may have an average molecular weight of from 1,000 to 3,500; the polypropylene powder used may have an average molecular weight of from 120,000 to 350,000. In any event, all ingredients in the denture adhesive powder are thoroughly agitated or stirred to yield a generally homogenous intermixing of all components. A most preferred denture adhesive powder contains 17.5% cationic polymer, 31.5% anionic protein material, 49.8% polyethylene powder, and minor amounts of other ingredients including flavor, colorants, anti-caking agents and the like.

In the paste formulations, the cationic polymer and the anionic protein material are admixed with petrolatum, mineral, animal or vegetable oils, and the like, along with flavors, colorants and certain commonly used preservatives and fillers.

A particularly preferred paste or cream formulation is prepared by utilizing as the cream or paste base, the product of U.S. Pat. No. 3,215,599. The cream or paste base of this patent is characterized as a mixture of white petroleum oil with a minor amount of a polyethylene wax having an average molecular weight of 1,000 to 20,000. This product is described as having emollient properties, useful in the formulation of medicaments where absorption of the medicament by the skin is of paramount importance. Denture adhesive creams formulated with this petroleum oil/polyethylene wax blend as the paste or cream base display unusually good stability, extrudability and product appearance. The successful use of a "cosmetic" or "medicinal" vehicle in the denture adhesive of the invention, to provide a cream formulation of improved properties is most unexpected.

Concentrations of ingredients in a cream or paste denture adhesive are as follows: for the cationic polymer, from 1% to 40%, preferably 5% to 25% by weight based on the weight of the total formulation; for the anionic protein material, from 5% to 50%, preferably 15% to 40% by weight based on the weight of the total formulation; and for the cream base, from 30% to 65%, preferably 40% to 60% by weight, based on the weight of the total formulation. In the aforementioned denture adhesive cream formulation containing the petroleum oil with polyethylene wax blend of U.S. Pat. No. 3,215,599, the petroleum oil and the polyethylene wax are used in amounts of from 3% to 20%, preferably 5% to 15% of polyethylene wax and 80% to 97%, preferably 85% to 95% by weight of petroleum oil, based on the total weight of the cream or paste base in the denture adhesive formulation. Thus, a particularly preferred denture adhesive cream formulation contains 17.5% cationic polymer, 31.5% anionic protein material, 6.5% polyethylene wax, 44.2% white petroleum oil and minor amounts of other ingredients including flavor, colorants, preservatives and the like.

Whether formulated as a powder or paste, the denture adhesive mixture of this invention, when applied to dentures and exposed to moisture, hydrates to form an adhesive combination markedly superior to prior art, preformed adhesive materials.

In order to further illustrate this invention, the following examples are given:

EXAMPLE 1

Preparation of Denture Adhesive Cream

A. Weigh 44.23 pounds of heavy mineral oil into a steam-jacketed Hobart mixer and heat to 90°C. At 90°C, add 6.5 pounds of a polyethylene wax of average molecular weight 2000, and disperse the wax thoroughly in the mineral oil while force cooling the batch to 70°C during mixing. At 70°C, add 0.05 pounds of methyl paraben and 0.10 pounds of propyl paraben, and mix well, while force cooling the batch to 45°C.

B. In a Hobart mixer, add 17.5 pounds of a copolymer of 85% by weight acrylamide with 15% by weight 2-methacryloyloxyethyltrimethyl ammonium methylsulfate; 31.507 pounds of sodium caseinate and 0.013 pounds of FD and C Red No. 3 Lakolene (19% pure dye); mix these dry ingredients until complete blending is achieved. At 45°C, add B to A and mix for about 15 minutes with the Hobart blades.

C. Add 0.10 pounds of peppermint oil, U.S.P. to the mixture of A and B and mix at a high speed until a homogeneous cream is obtained.

EXAMPLE 2

Preparation of Denture Adhesive Cream

A denture adhesive cream is prepared from the following ingredients:

| | | |
|---|---|---|
| Copolymer of acrylamide and 2-acryloyloxyethyltrimethyl ammonium methylsulfate | 120.0 | pounds |
| Potassium caseinate | 230.0 | pounds |
| Petrolatum | 329.9 | pounds |
| Mineral Oil | 318.0 | pounds |
| Propyl paraben | 1.00 | pounds |
| Peppermint Oil | 1.00 | pounds |
| F.D. & C. Red No. 3 Aluminum Lake | 0.10 | pounds |

The mineral oil and petrolatum are added to a steam-jacketed Hobart mixer and heated to 70°C. At 70°C, the propyl paraben is added, mixed well and the mixture is force-cooled to 45°C. The procedure of Example 1, parts B and C, is followed for all of the remaining ingredients.

EXAMPLE 3

Preparation of a Denture Adhesive Cream

A. Into a steam-jacketed Hobart mixer, add 45.0075 pounds of heavy mineral oil, and heat to 90°C. At 90°C, add 7 pounds of a polyethylene wax of average molecular weight 1000, and disperse the two ingredients thoroughly, while force cooling to 70°C during mixing. At 70°C, add 0.05 pounds of methyl paraben and 0.10 pounds of propyl paraben and mix well, while force cooling the batch to 45°C.

B. In a Hobart mixer, add 30.73 pounds of sodium caseinate; 17 pounds of the cationic copolymer of acrylamide with 2-methacryloyloxy ethyltrimethyl ammonium methylsulfate; and 0.0125 pounds of F.D. & C. Red No. 3, Lakolene (19% pure dye) and mix these dry ingredients until complete blending is achieved. Add B to A, at 45°C and mix for 15 minutes with the Hobart blades.

C. Add 0.10 pounds of peppermint oil, U.S.P. to the mixture of A and B, and mix at high speeds until a homogeneous cream is obtained. Continue mixing until the batch reaches a temperature of 25°C.

EXAMPLE 4

Preparation of Denture Adhesive Cream

A denture adhesive cream is prepared from the following ingredients:

| | | |
|---|---|---|
| Copolymer of acrylamide and 1,2-dimethyl-5-vinyl pyridinium methylsulfate | 200 | pounds |
| Sodium Caseinate | 350 | pounds |
| Petrolatum | 445 | pounds |
| Methyl Paraben | 0.5 | pounds |
| Propyl Paraben | 1.0 | pounds |
| Peppermint Oil | 2.0 | pounds |
| F.D. & C. Red No. 3 Aluminum Lake | 1.5 | pounds |

The petrolatum is added to a steam-jacketed Hobart mixer and heated to 70°C. At 70°C, the methyl paraben and propyl paraben are added, mixed well, and the mixture is force-cooled to 45°C. The procedure of Example 1, parts B and C, is followed for all of the remaining ingredients.

EXAMPLE 5

Preparation of Denture Adhesive Cream

A denture adhesive cream is prepared, from the following ingredients:

| | | |
|---|---|---|
| O-Ethyltrimethylammonium chloride-substituted anhydroglucose polymer | 175 | pounds |
| Sodium Caseinate | 325 | pounds |
| Petrolatum | 496.5 | pounds |
| Propyl Paraben | 1.5 | pounds |
| Peppermint Oil | 1.0 | pounds |
| F.D. & C. Red No. 3 Aluminum Lake | 1.0 | pounds |

The petrolatum is added to a steam-jacketed Hobart mixer and heated to 70°C. At 70°C, the propyl paraben is added, mixed well, and the mixture is force-cooled to 45°C. The procedure of Example 1, parts B and C, is followed for all of the remaining ingredients.

EXAMPLE 6

Preparation of Denture Adhesive Cream

A denture adhesive cream is prepared from the following ingredients:

| | | |
|---|---|---|
| Polyvinyl alcohol | 125.0 | pounds |
| Copolymer of acrylamide and methacryloyloxymethyltrimethyl ammonium methylsulfate | 62.5 | pounds |
| Sodium Caseinate | 62.5 | pounds |
| Petrolatum | 149.0 | pounds |
| Mineral Oil | 100 | pounds |
| Propyl Paraben | 0.50 | pounds |
| Methyl Paraben | 0.50 | pounds |
| F.D. & C. Red No. 3 Aluminum Lake | 0.50 | pounds |
| Imitation Peppermint Oil | 0.50 | pounds |

The petrolatum and mineral oil are added to a steam-jacketed mixture and heated to 70°C. At 70°C, the methyl paraben and propyl paraben are added and the mixture is force-cooled to 45°C. The procedure of Example 1, parts B and C, is followed for all of the remaining ingredients.

EXAMPLE 7

Preparation of Denture Adhesive Powder

A denture adhesive powder is prepared to contain the following ingredients:

| | | |
|---|---|---|
| Copolymer of acrylamide and 3-methyacryloyloxypropyltrimethyl methylsulfate | 175 | pounds |
| Sodium Caseinate | 315 | pounds |
| Micronized Silica | 10 | pounds |
| Polyethylene Wax | 498.5 | pounds |
| Peppermint Oil | 1.25 | pounds |

The peppermint oil is well dispersed in about 25 pounds of the sodium caseinate.

The micronized silica is similarly dispersed in about 25 pounds of the sodium caseinate.

The two premixes are then added to the balance of the defatted soy flour which has previously been placed in a ribbon blender mixing apparatus. The whole is then mixed for about 15 minutes, after which the 175 pounds of the copolymer is added and the batch mixed for an additional 15 minutes.

EXAMPLE 8

Preparation of Denture Adhesive Powder

A denture adhesive powder is prepared, according to the procedure of Example 7, from the following ingredients:

| | |
|---|---|
| 0-Ethyltrimethylammonium chloride-substituted anhydroglucose | 188 pounds |
| Casein | 313 pounds |
| Polyethylene Wax | 498 pounds |
| Anise Oil | 1 pound |

EXAMPLE 9

Preparation of Denture Adhesive Powder

A denture adhesive powder is prepared according to the procedure of Example 7, from the following ingredients:

| | |
|---|---|
| Copolymer of acrylamide and β-methylacryloyloxyethyltrimethyl ammonium methylsulfate | 19.0 pounds |
| Sodium Caseinate | 34.5 pounds |
| Polyethylene Wax | 46.4 pounds |
| Spearmint Oil | 0.05 pounds |
| Peppermint Oil | 0.05 pounds |

EXAMPLE 10

Preparation of Denture Adhesive Powder

A denture adhesive powder is prepared, according to the procedure of Example 7, from the following ingredients:

| | |
|---|---|
| Copolymer of acrylamide and 2-methylacryloxyethyltrimethyl ammonium methylsulfate | 410 pounds |
| Sodium Caseinate | 589 pounds |
| Peppermint Oil | 1 pound |

We claim:
1. A denture adhesive comprising a dry mixture of:
   A. from about 1.0% to about 80% by weight, based on the total weight of the denture adhesive, of at least one cationic polymeric material selected from the group consisting of:
      1. a copolymer of an acrylamide having the Formula (I)

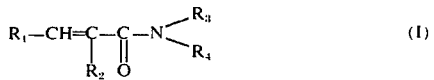

wherein $R_1$ is methyl or hydrogen; and $R_2$, $R_3$, and $R_4$ are each hydrogen or 1 to 7 carbon lower alkyl, with a vinyl quaternary ammonium salt selected from the group consisting of trialkylaminoalkyl acrylate salts, trialkylaminoalkyl methacrylate salts, and vinyloxyalkyltrialkylammonium salts, wherein the alkyl group contains from 1 to 7 carbon atoms; and 2. a copolymer of an acrylamide having the Formula (I) above with a vinyl or alkyl-substituted vinyl pyridinium salt, wherein the alkyl group is 1 to 7 carbon lower alkyl; and
   B. from about 10% to about 90% by weight, based on the total weight of the denture adhesive, of at least one anionic protein material which is casein or its alkali metal salts.

2. A denture adhesive according to claim 1 which additionally contains from about 40% to about 60% by weight, based on the total weight of the denture adhesive, of a powdered polymeric material having a particle size of less than 422 microns, selected from the group consisting of powdered polyethylene having a molecular weight of from 1,000 to 3,500, and powdered polypropylene having a molecular weight of from about 120,000 to about 350,000.

3. A denture adhesive according to claim 2 comprising a dry mixture of from about 3.0% to about 50% by weight of at least one cationic polymeric material selected from the group consisting of copolymers of acrylamide with a vinyl quaternary ammonium salt selected from the group consisting of trialkylaminoalkyl acrylate salts, trialkylaminoalkyl methacrylate salts, and vinyloxyalkyltrialkylammonium salts, wherein the alkyl group contains from 1 to 3 carbon atoms; and from about 20% to about 80% by weight of at least one anionic protein material which is casein or its alkali metal salts.

4. A denture adhesive according to claim 3 wherein the cationic polymeric material is at least one copolymer of acrylamide with a trialkylaminoalkyl methacrylate salt having from 1 to 3 carbon atoms in the alkyl groups; the anionic protein material is sodium caseinate; and wherein there is additionally present from about 45% to about 55% by weight of powdered polyethylene.

5. A denture adhesive according to claim 1 which additionally contains from about 30% to about 65% by weight, based on the weight of the total denture adhesive composition of at least one cream base material selected from the group consisting of petrolatum, mineral, animal or vegetable oils.

6. A denture adhesive according to claim 5 containing from about 40% to about 60% of a cream base material which is a combination of mineral oil with a minor amount of polyethylene wax having a molecular weight of from 1,000 to 20,000.

7. A denture adhesive according to claim 6 comprising a dry mixture of from about 5% to about 25% of at least one cationic polymeric material selected from the group consisting of copolymers of acrylamide with a vinyl quaternary ammonium salt selected from the group consisting of trialkylaminoalkyl acrylate salts, trialkylaminoalkyl methacrylate salts, and vinyloxyalkyltrialkylammonium salts, wherein the alkyl group contains from 1 to 3 carbon atoms; and from about 15% to about 40% by weight of at least one anionic protein material which is casein or its alkali metal salts.

8. A denture adhesive according to claim 7 wherein the cationic polymeric material is at least one copolymer of acrylamide with a trialkylaminoalkyl methacrylate salt having from 1 to 3 carbon atoms in the alkyl group; the anionic protein material is sodium caseinate; and wherein there is additionally present from about 40% to about 60% of a cream base material which is a combination of 85% to 95% by weight of mineral oil with from about 5% to about 15% of a polyethylene wax.

9. A denture adhesive comprising a dry mixture of:
A. from about 1.0% to about 80% by weight, based on the total weight of the denture adhesive, of at least one cationic polymeric material selected from the group consisting of O-lower alkyl-trimethylammoniumchloride-substituted-anhydroglucose polymers, wherein the alkyl group is a 1 to 7 carbon lower alkyl group; and
B. from about 10% to about 90% by weight, based on the total weight of the denture adhesive, of at least one anionic protein material which is casein or its alkali metal salts.

10. A denture adhesive according to claim 9 which additionally contains from about 40% to about 60% by weight, based on the total weight of the denture adhesive, of a powdered polymeric material having a particle size of less than 422 microns, selected from the group consisting of powdered polyethylene having a molecular weight of from about 1000 to about 3,500, and powdered polypropylene having a molecular weight of from about 120,000 to about 350,000.

11. A denture adhesive according to claim 10 comprising a dry mixture of from about 3.0% to about 50% by weight of at least one cationic polymeric material and from 20% to about 80% of at least one anionic protein material which is casein or its alkali metal salts.

12. A denture adhesive according to claim 11 wherein the cationic polymeric material is an O-ethyl-trimethylammonium chloride-substituted anhydroglucose polymer; the anionic protein material is sodium caseinate; and wherein there is additionally present from about 45% to about 55% by weight of powdered polyethylene.

13. A denture adhesive according to claim 9 which additionally contains from about 30% to about 65% by weight, based on the weight of the total denture adhesive composition of at least one cream base material selected from the group consisting of petrolatum, mineral, animal or vegetable oils.

14. A denture adhesive according to claim 13 containing from about 40% to about 60% of a cream base material which is a combination of mineral oil with a minor amount of polyethylene wax having a molecular weight of from 1,000 to 20,000.

15. A denture adhesive according to claim 14 comprising a dry mixture of from about 5.0% to about 25% by weight of at least one cationic polymeric material and from 15% to about 40% of at least one anionic protein material which is casein or its alkali metal salts.

16. A denture adhesive according to claim 15 where the cationic polymeric material is an O-ethyltrimethylammonium chloride-substituted anhydroglucose polymer; the anionic protein material is sodium caseinate; and wherein there is additionally present from about 40% to about 60% by weight of a cream base material which is a combination of from about 85% to about 95% by weight of mineral oil in combination with from about 5% to about 15% by weight of a polyethylene wax.

* * * * *